(12) United States Patent
Effenberger (10) Patent No.: US 8,059,962 B2
(45) Date of Patent: Nov. 15, 2011

(54) INTERLEAVING FOR 10G GPON

(75) Inventor: Frank J. Effenberger, Freehold, NJ (US)

(73) Assignee: Futurewei Technologies, Inc., Plano, TX (US)

(*) Notice: Subject to any disclaimer, the term of this patent is extended or adjusted under 35 U.S.C. 154(b) by 810 days.

(21) Appl. No.: 12/051,592

(22) Filed: Mar. 19, 2008

(65) Prior Publication Data
US 2008/0298806 A1 Dec. 4, 2008

Related U.S. Application Data

(60) Provisional application No. 60/940,729, filed on May 30, 2007.

(51) Int. Cl.
*H04J 14/08* (2006.01)

(52) U.S. Cl. ............ 398/98; 398/99; 398/100; 398/68; 398/69; 398/72; 398/71; 398/79; 370/352; 370/468; 370/389; 370/392; 370/395.4

(58) Field of Classification Search .............. 398/35, 398/47, 52, 58, 74, 75, 98, 99, 100, 66, 67, 398/68, 69, 70, 71, 72, 73, 79, 135, 154, 398/155, 89; 370/352, 392, 389, 468, 466, 370/252, 254, 395.4
See application file for complete search history.

(56) References Cited

U.S. PATENT DOCUMENTS

| | | | |
|---|---|---|---|
| 7,002,968 B1 * | 2/2006 | Tomizawa et al. | 370/395.52 |
| 2002/0145775 A1 * | 10/2002 | Effenberger et al. | 359/123 |
| 2003/0076560 A1 | 4/2003 | Pratt et al. | |
| 2004/0208537 A1 * | 10/2004 | Lee et al. | 398/41 |
| 2005/0152697 A1 | 7/2005 | Lee et al. | |
| 2007/0019956 A1 * | 1/2007 | Sorin et al. | 398/71 |

FOREIGN PATENT DOCUMENTS

WO 2006048859 A2 5/2006

OTHER PUBLICATIONS

Foreign Communication From a Related Counterpart Application—International Search Report and Written Opinion, PCT/CN2008/071074, Sep. 11, 2008, 10 pages.
Series G: Transmission Systems and Media, Digital Systems and Networks—Digital Sections and Digital Line System—Optical Line Systems for Local and Access Networks—Broadband Optical Access Systems Based on Passive Optical Networks (PON), International Telecommunication Union, ITU-T G.983.1 (Jan. 2005).
Series G: Transmission Systems and Media, Digital Systems and Networks—Digital Sections and Digital Line System—Optical Line Systems for Local and Access Networks—Broadband Optical Access Systems Based on Passive Optical Networks (PON), International Telecommunication Union, ITU-T G.983.1 (Oct. 1998).

* cited by examiner

*Primary Examiner* — Hanh Phan
(74) *Attorney, Agent, or Firm* — Conley Rose, P.C.; Grant Rodolph (57) ABSTRACT

An apparatus comprising a plurality of data framers, a time division multiplexer coupled to the data framers, and an optical transmitter coupled to the time division multiplexer. Also disclosed is an apparatus comprising an optical receiver, a time division demultiplexer coupled to the optical receiver, and a data framer coupled to the time division demultiplexer. Also disclosed is an apparatus comprising at least one component configured to implement a method comprising combining a first plurality of data frames corresponding to a first plurality of channels into a first plurality of combined data frames using time division multiplexing and transmitting the first combined data frames over a single optical channel.

20 Claims, 5 Drawing Sheets

INTERLEAVING FOR 10G GPON

CROSS-REFERENCE TO RELATED APPLICATIONS

The present application claims priority to U.S. Provisional Patent Application Ser. No. 60/940,729 filed May 30, 2007 by Effenberger and entitled, "Interleaving for 10 G GPON,"which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network terminals (ONTs) at the customer premises. In some PON systems, such as Gigabit PON (GPON) systems, downstream data is broadcasted at about 2.5 Gigabits per second (Gbps) while upstream data is transmitted at about 1.25 Gbps. However, the bandwidth capability of the PON systems is expected to increase as the demands for services increase. To meet the increased demand in services, the OLT logic devices need to be reconfigured to transmit the data frames at higher bandwidths, for example at about 10 Gbps. The logic devices at the ONTs also need to be reconfigured to process the received data at higher bandwidths, which can be computationally expensive for some processes, such as forward error correction (FEC).

A plurality of existing communication links or channels in the PON system can be combined using wavelength division multiplexing to establish a channel with higher bandwidth without reconfiguring the logic devices or significantly increasing the data processing time. For example, four different wavelength channels with equal bandwidths at about 2.5 Gbps can be combined to establish a single communication channel at about 10 Gbps. However using wavelength division multiplexing to establish the single channel can be limited by the number of available wavelength channels in the PON systems.

SUMMARY

In one embodiment, the disclosure includes an apparatus comprising a plurality of data framers, a time division multiplexer coupled to the data framers, and an optical transmitter coupled to the time division multiplexer.

In another embodiment, the disclosure includes an apparatus comprising an optical receiver, a time division demultiplexer coupled to the optical receiver, and a data framer coupled to the time division demultiplexer.

In yet another embodiment, the disclosure includes an apparatus comprising at least one component configured to implement a method comprising combining a first plurality of data frames corresponding to a first plurality of channels into a first plurality of combined data frames using time division multiplexing and transmitting the first combined data frames over a single optical channel.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for increasing communications bandwidth in a PON without reconfiguring the PON logic devices and protocols. The bandwidth may be increased by combining a plurality of individual channels with smaller bandwidths using TDM. Specifically, data frames with the smaller bandwidths may be generated using a plurality of framers. The generated data frames may be combined using a TDM multiplexer. The resulting combined data frames may be transmitted downstream from the OLT over a single optical channel with a bandwidth about equal to the sum of the smaller bandwidths. The combined data frames may be received at each ONT, and the data frames assigned to the ONT may be retrieved using a TDM demultiplexer. Specifically, the ONT may extract the data frames associated with its channel while ignoring the remaining data frames. Conversely, the upstream data frames may be transmitted to the OLT using wavelength division multiplexing (WDM).

Figure 1:
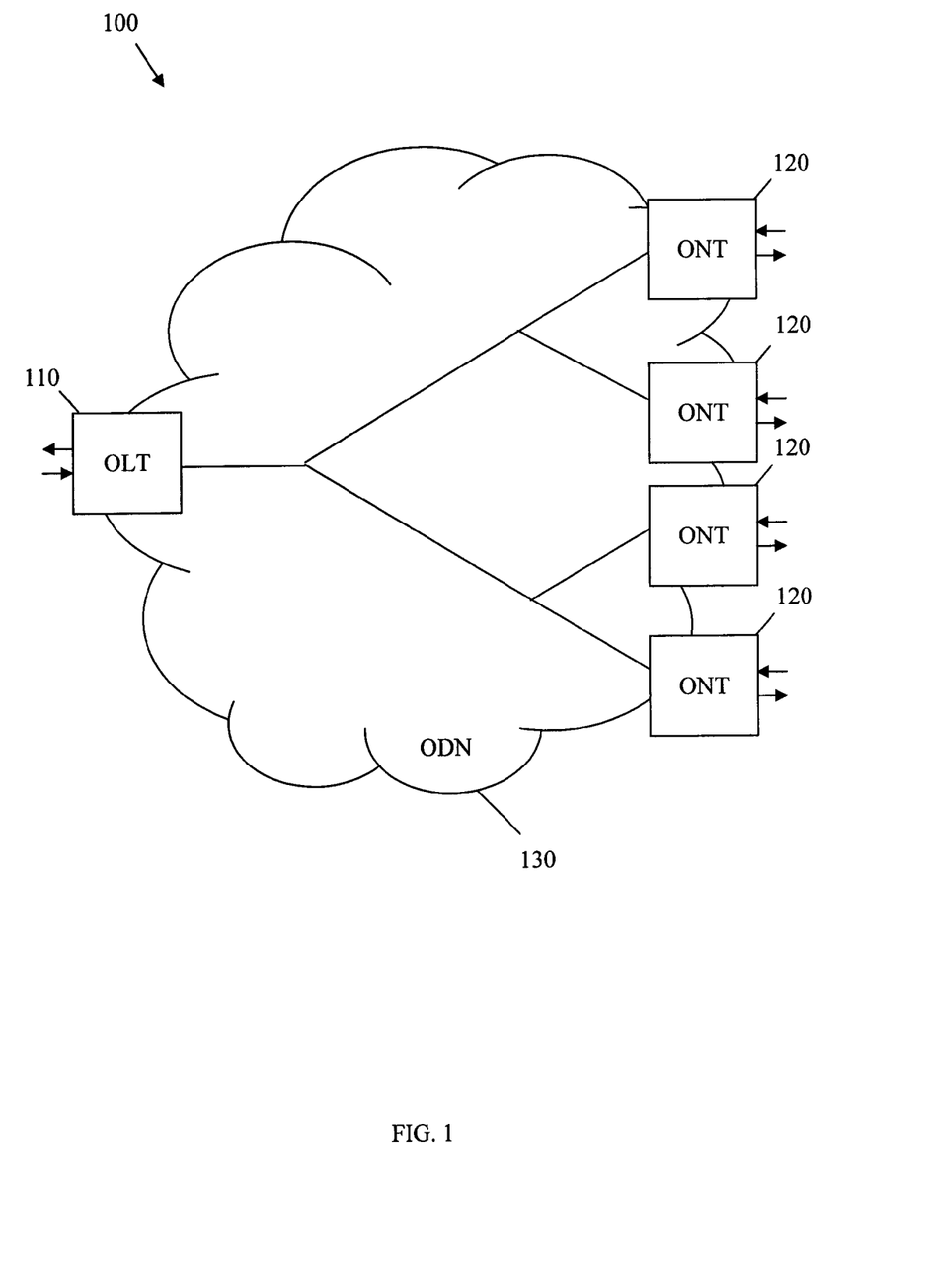
FIG. 1 is a schematic diagram of an embodiment of a PON.

FIG. 1 illustrates one embodiment of a PON 100. The PON 100 comprises an OLT 110, a plurality of ONTs 120, and an ODN 130. The PON 100 is a communications network that does not require any active components to distribute data between the OLT 110 and the ONTs 120. Instead, the PON 100 uses the passive optical components in the ODN 130 to distribute data between the OLT 110 and the ONTs 120. Examples of suitable PONs 100 include the asynchronous transfer mode PON (APON) and the broadband PON (BPON) defined by the ITU-T G.983 standard, the GPON defined by the ITU-T G.984 standard, the Ethernet PON (EPON) defined by the IEEE 802.3ah standard, and the WDM PON (WPON), all of which are incorporated by reference as if reproduced in their entirety.

One component of the PON 100 may be the OLT 110. The OLT 110 may be any device that is configured to communicate with the ONTs 120 and another network (not shown). Specifically, the OLT 110 may act as an intermediary between the other network and the ONTs 120. For instance, the OLT 110 may forward data received from the network to the ONTs 120, and forward data received from the ONTs 120 onto the other network. Although the specific configuration of the OLT 110 may vary depending on the type of PON 100, in an embodiment, the OLT 110 may comprise a transmitter and a receiver, as explained in detail below. When the other network is using a protocol, such as Ethernet or Synchronous Optical Networking/Synchronous Digital Hierarchy (SONET/SDH), that is different from the communications protocol used in the PON 100, the OLT 110 may comprise a converter that converts the other network's data into the PON's protocol. The OLT 110 converter may also convert the PON's data into the other network's protocol. The OLT 110 described herein is typically located at a central location, such as a central office, but may be located at other locations as well.

Another component of the PON 100 may be the ONTs 120. The ONTs 120 may be any devices that are configured to communicate with the OLT 110 and a customer or user (not shown). Specifically, the ONTs may act as an intermediary between the OLT 110 and the customer. For instance, the ONTs 120 may forward data received from the OLT 110 to the customer, and forward data received from the customer onto the OLT 110. Although the specific configuration of the ONTs 120 may vary depending on the type of PON 100, in an embodiment, the ONTs 120 may comprise an optical transmitter configured to send optical signals to the OLT 110. Additionally, the ONTs 120 may comprise an optical receiver configured to receive optical signals from the OLT 110 and a converter that converts the optical signal into electrical signals for the customer, such as signals in the Asynchronous Transfer Mode (ATM) or Ethernet protocol. The ONTs 120 may also comprise a second transmitter and/or receiver that may send and/or receive the electrical signals to a customer device. In some embodiments, ONTs 120 and optical network units (ONUs) are similar, and thus the terms are used interchangeably herein. The ONTs are typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONTs 120. The ODN 130 typically extends from the OLT 110 to the ONTs 120 in a branching configuration as shown in FIG. 1, but may be alternatively configured in any other configuration.

Figure 2:
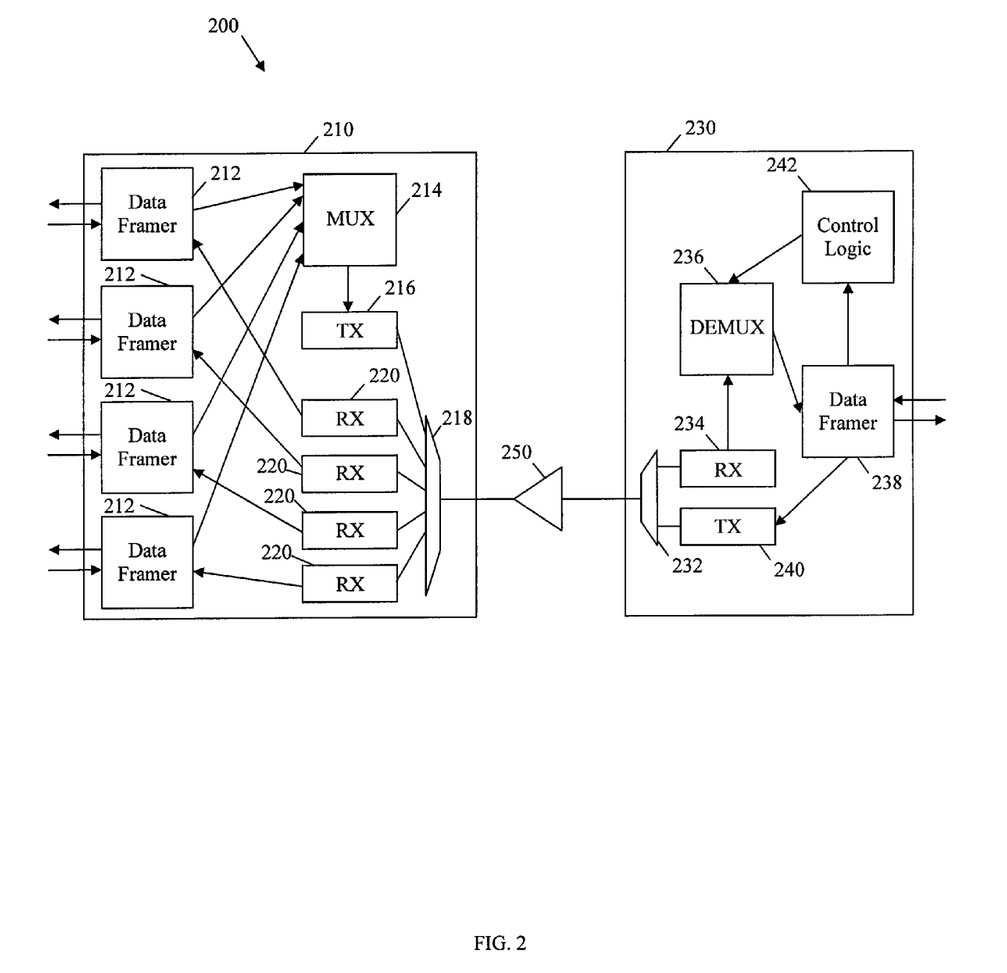
FIG. 2 is a schematic diagram of another embodiment of a PON.

FIG. 2 illustrates another embodiment of a PON 200. The PON 200 may comprise an OLT 210 coupled to at least one ONT 230 via a splitter 250. The OLT 210 and the ONT 230 may be modified to increase communications bandwidth in the PON 200 using existing PON logic components. Specifically, the PON 200 may provide increased downstream communications bandwidth using TDM at the OLT 210 and time division demultiplexing at the ONT 230 using existing logic devices in the OLT 210 and the ONT 230. For example, the PON 200 may provide a larger, e.g. about 10 Gbps, bandwidth for downstream communications by multiplexing a plurality of communication channels with smaller bandwidths, e.g. four channels each about 2.5 Gbps. The ONTs 230 may transmit data upstream using a plurality of wavelength channels, which may be multiplexed using WDM to provide the increased bandwidth. Although a single ONT 230 is shown in FIG. 2, the PON 200 may comprise any number of ONTs 230 coupled to the OLT 210.

The OLT 210 may comprise a plurality of data framers 212, a TDM multiplexer 214, a transmitter 216, a WDM multiplexer 218, and a plurality of receivers 220. The OLT 210 may use the transmitter 216 and the receivers 220 in conjunction with the data framers 212 and the TDM multiplexer 214 to increase the supported communications bandwidth. In some embodiments, the OLT 210 may also comprise a controller that assigns downstream and upstream channels to the ONTs 230.

Each of the data framers 212 may be configured to frame data at a first rate and deframe data at a second rate. For instance, the OLT 210 may comprise four similar data framers 212, as shown in FIG. 1, which may each deframe the data at about 1.25 Gbps and frame the data at about 2.5 Gbps. Alternatively, the data framers may be different data framers that may each be configured to frame and deframe the data at different rates. Each data framer 212 may be associated with a channel that may be in turn associated with one or more ONTs 230. Each data framer 212 may add or include a mark or pattern, such as a label or a header, in the corresponding data frames that may be used to associate the data frames with the corresponding channel.

The TDM multiplexer 214 may be coupled to the data framers 212 and may be configured to receive the data frames associated with each separate channel at similar or different bandwidths. The TDM multiplexer 214 may interleave the received data frames into a single stream of combined data frames. Specifically, the TDM multiplexer 214 may divide the data frames into bit streams or byte streams and redistribute the bit streams or byte streams, respectively, into data frames or blocks, which may be of different sizes that the received data frames. Furthermore, the data frames received at about equal bandwidths may be allocated about equal portions of the combined data frames, while the data frames received at different bandwidths may be allocated at different portions of the combined data frames. The combined data frames may then be forwarded downstream over a single channel at a bandwidth about equal to the sum of the separate channels' bandwidths. For instance, the TDM multiplexer 214 may receive the data frames from the four data framers 212 over four separate channels at about 2.5 Gbps, combine the data frames, and forward the combined data frames at about 10 Gbps.

The transmitter 216 may be coupled to the TDM multiplexer 214 and may be configured to transmit the combined data frames over the single channel. The transmitter 216 may be an optical transmitter and configured to transmit the combined data frames downstream at about the single channel bandwidth and using a single wavelength or wavelength channel. For instance, the transmitter 216 may transmit the combined data frames, forwarded from the TDM multiplexer 214, at about 10 Gbps and a wavelength equal to about 1490 nanometers (nm).

The WDM 218 may be coupled to the transmitter 216 and the receivers 220. The WDM 218 may route the combined data frames downstream from the TDM multiplexer 214 to the ONTs 230. The WDM 218 may also route data frames transmitted upstream from the ONTs 230 to the receivers 220. For instance, the WDM 218 may be an optical filter that may separate the optical signals transmitted downstream at about 1490 nm from the optical signals transmitted upstream using a plurality of other wavelength channels. The WDM 218 may also forward each of the separated optical signals corresponding to the other wavelength channels to one of the receivers 220.

Each receiver 220 may receive, via the WDM 218, the data frames corresponding to one of the upstream wavelength channels at similar bandwidths. For instance, the WDM 218 may be coupled to four receivers 220, which may receive the data frames transmitted upstream at about 1.25 Gbps and over four separate wavelength channels. Each receiver 220 may then send the received data frames over one separate channel at about the same rate to one of the four data framers 212. In other embodiments of the OLT 210, some of the receivers 220 may receive the data frames transmitted upstream over the different wavelength channels at different bandwidths. Some of the receivers 220 may also be coupled to more than one of the data framers 212 and may send the received data frames to the data framers 212 at the corresponding bandwidths.

The ONT 230 may comprise a WDM 232, a receiver 234, a TDM demultiplexer 236, a data framer 238, a transmitter 240, and a control logic 242. The receiver 234 and the transmitter 240 of the ONT 230 may be similar to those used by the ONT 120. The ONT 230 may use the receiver 234 and the transmitter 240 in conjunction with the TDM demultiplexer 236, the data framer 238, and the control logic 242 to increase the supported communications bandwidth.

The WDM 232 may be coupled to the receiver 234 and the transmitter 240. The WDM 232 may route the combined data frames transmitted downstream from the OLT 210 to the receiver 234. The WDM 232 may also route upstream data frames from the transmitter 240 to the OLT 210. For instance, the WDM 232 may be an optical filter similar to the WDM 218, which may separate the optical signals transmitted from the OLT 210 at about 1490 nm and the optical signals transmitted from the ONT 230 at a different wavelength channel.

The receiver 234 may receive, via the WDM 232, the combined data frames over the single channel established at the OLT 210 and at a rate about equal to the transmitter 216 rate. For instance, the receiver 234 may receive at about 10 Gbps the combined data frames comprising the data frames corresponding to the four separate channels established each at the OLT 210 with a bandwidth at about 2.5 Gbps. The receiver 234 may be coupled to the TDM demultiplexer 236 and send the combined data frames to the TDM demultiplexer 236.

The TDM demultiplexer 236 may receive the combined data frames and obtain from the combined data frames the data frames associated with one of the separate channels. Specifically, the TDM demultiplexer 236 may use the marks or patterns in the combined data frames to distinguish the data frames associated with one of the channels from the data frames associated with the remaining channels. The TDM demultiplexer 236 may hence separate the data frames associated with the one channel, reformat the data frames into the original rate of the channel, and forward the data frames to the data framer 238. For instance, the TDM demultiplexer 236 may receive the combined data frames transmitted at about 10 Gbps from the OLT 210, and obtain from the combined data frames the data frames generated at one of the data framers 212 at about 2.5 Gbps. In doing so, the TDM demultiplexer may disregard the data frames corresponding to remaining channels. Thus, the data framer 238 may only receive a portion of the downstream data stream.

The data framer 238 may be coupled to the TDM demultiplexer 236. The data framer 238 may be configured to frame the separated data frames from the TDM demultiplexer 236 at a first rate and deframe the data at a second rate. The data framer 238 may deframe the data at a first rate about equal to the framing rate of one of the data framers 212, and frame the data at a second rate about equal to the deframing rate of the data framer 212. For instance, the data framer 238 may deframe the separated data frames from the TDM demultiplexer 236 at about 2.5 Gbps and frame the data frames at about 1.25 Gbps. Moreover, the data framer 238 may extract some channel assignment information from the separated data frames, and pass such to the control logic 242.

The transmitter 240 may be coupled to the data framer 238 and may be configured to transmit the data frames received from the data framer 238 at about the same rate. The transmitter 242 may be an optical transmitter configured to transmit the data frames upstream, via the WDM 234, using one of the channels received at the OLT 210. For instance, the transmitter 242 may receive the data frames at about 1.25 Gbps from the TDM multiplexer 236 and transmit the data frames upstream at about the same rate using one of the four separate wavelength channels received at the OLT 210.

The control logic 242 may be coupled to the TDM demultiplexer 236 and the data framer 238. The control logic 242 may use the channel assignment information extracted by the data framer 238 to control the TDM demultiplexer 236. Specifically, the assignment information may be used to inform the TDM demultiplexer 236 of the ONTs assigned channel. For instance, the control logic 242 may forward the mark or pattern associated with the assigned channel to the TDM demultiplexer 236, where the mark or pattern may be used to distinguish and separate the data frames of the assigned channel.

The ONTs 230 may be assigned their channel assignments using a variety of methods. In one embodiment, the assigned channel may be a fixed channel designated to the ONT 230 and used by the OLT 210 to communicate with the ONT 230. The channel may be designated during design of the ONT 230 or by the OLT 210 during initialization of the ONT 230 within the PON 200. As such, the TDM demultiplexer 236 may separate the data frames corresponding to the fixed channel at every transmission session from the OLT 210 and without using any assignment information. A plurality of fixed channels may also be designated during design of the ONTs 230. Alternatively, the assigned channel may be associated with the wavelength channel used to transmit the data frames upstream from the ONT 230 to the OLT 210. As such, a plurality of ONT 230 using a plurality of wavelength channels to communicate with the OLT 210 may be designated a plurality of associated channels. Each ONT 230 may hence separate the data frames corresponding to the assigned channel based on the wavelength channel used by the ONT 230.

In another embodiment, the assigned channel may be designated by the OLT 210 in a dynamic manner. Specifically, the OLT 210 may assign one of the channels to each ONT 230 or a group of ONTs 230 upon initialization. The OLT 210 may subsequently change the allocation of ONTs 230 to channels based on the bandwidth requirements of the ONTs 230. For example, a PON 200 may comprise 16 ONTs 230 arranged into four groups of four, wherein each group is associated with a single channel. If one ONT needs additional bandwidth, then that group can be allocated additional bandwidth. Alternatively or additionally, the other ONTs in that group can be moved to other channels such that the ONT needing additional bandwidth is the only ONT in the group, and hence the ONT can have its own channel.

In some embodiments, the PON 200 may use any upstream data transmission method. For example, the PON 200 may provide upstream communications bandwidth without using WDM and using a single wavelength channel shared by a plurality of ONT 230. The PON 200 may also provide increased upstream communications bandwidth using time division multiple access (TDMA) at the ONTs 230 and time division demultiplexing at the OLT 210.

In some embodiments, the bandwidth for upstream communications may also be increased using TDM at the ONT 230 and TDM time division demultiplexing at the OLT 210. For instance, the ONTs 230 may be configured, similar to the OLT 210 described above, to receive data frames from the OLT 210 over a plurality of wavelength channels, combine data frames, and transmit the combined data frames upstream over a single channel with increased bandwidth. The OLT 210 may also be configured, similar to the ONT 230 described above, to receive the combined data frames and obtain the data frames corresponding to the assigned channel.

Figure 3:
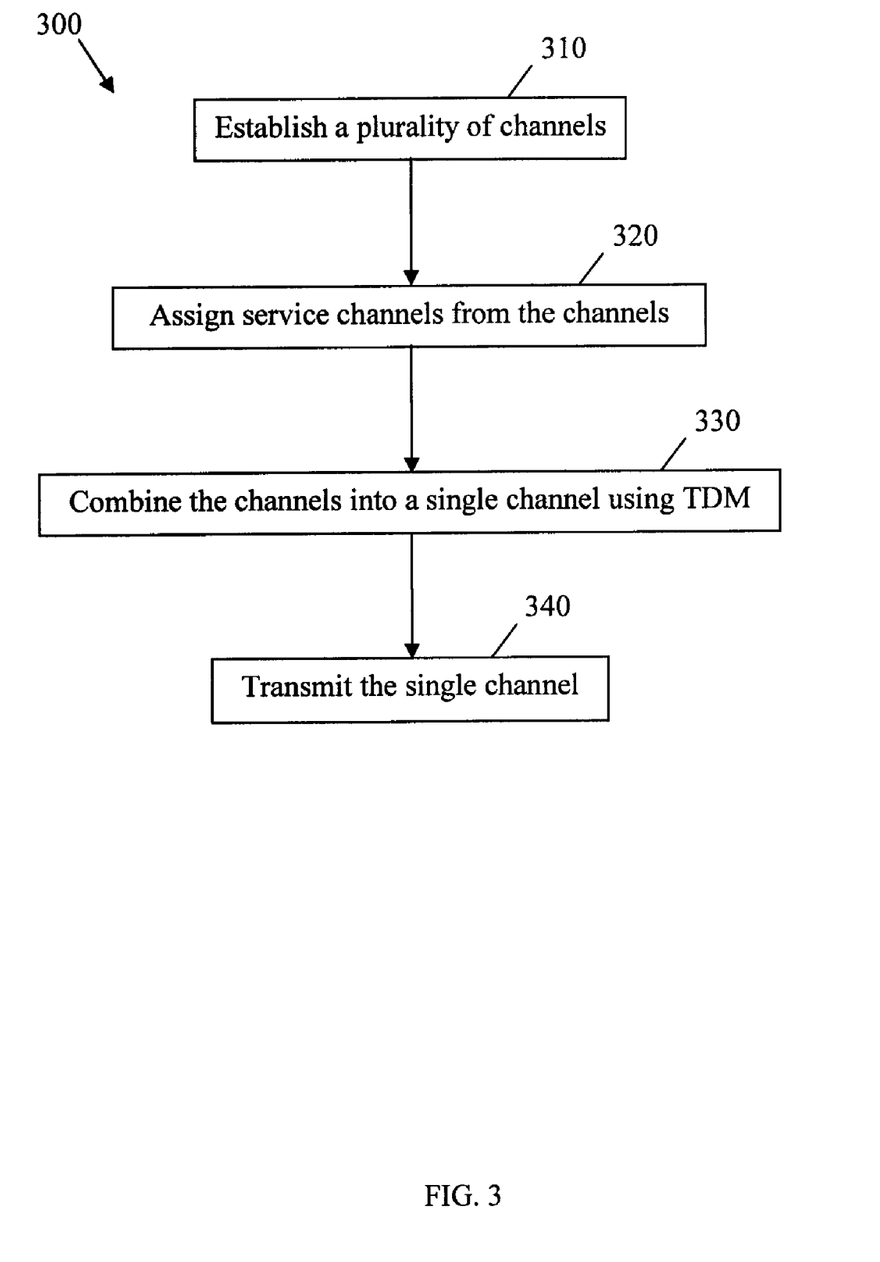
FIG. 3 is a flowchart of an embodiment of a time division multiplexing (TDM) interleaving method.

FIG. 3 illustrates one embodiment of a TDM interleaving method 300, which may be implemented in an OLT. The method 300 may transmit data at increased bandwidths using existing logic devices and without establishing additional downstream wavelength channels in the PON. At block 310, the method 300 may establish a plurality of channels with bandwidths that may be supported by the logic devices and may be compatible with the PON protocols and physical layer. In some embodiments, the method 300 may also associate the channels with upstream wavelength channels in the PON, which may have different bandwidths than the established channels. At block 320, the method 300 may assign different service channels for different destinations in the PON. At block 330, the method 300 may combine the established channels, including the service channels, using TDM into a single channel with a bandwidth about equal to the sum of bandwidths of the established channels. In some embodiments, the method 300 may also include assignment information related to the service channels in the single channel. At block 340, the method 300 may transmit the data over the single channel with the increased bandwidth.

Figure 4:
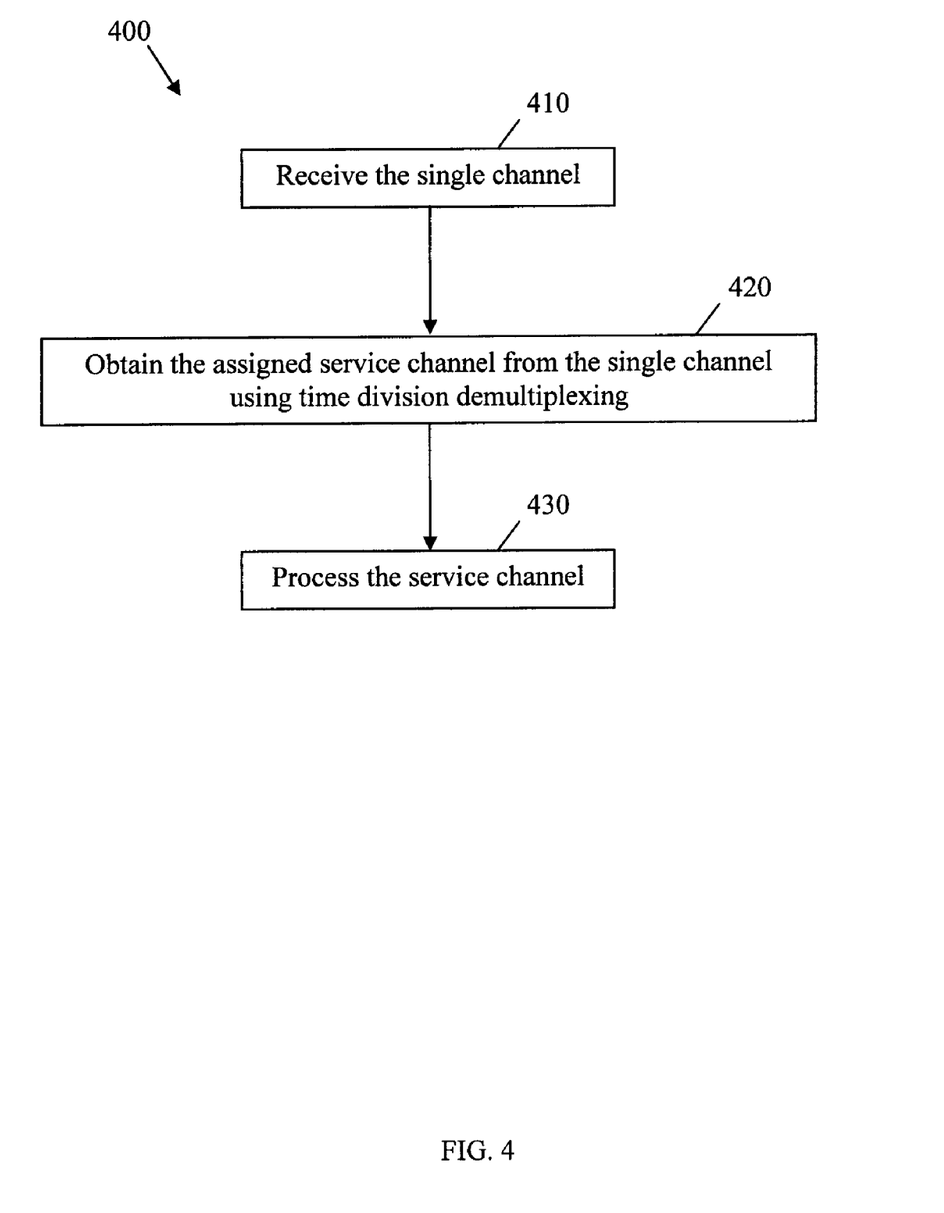
FIG. 4 is a flowchart of another embodiment of a TDM interleaving method.

FIG. 4 illustrates another embodiment of a TDM interleaving method 400, which may be implemented at an ONT. The method 400 may receive the multiplexed data from the OLT using existing logic devices. At block 410, the method 400 may receive the data over the single channel. At block 420, the method 400 may obtain the service channel corresponding to each destination from the single channel and disregard the remaining channels. In some embodiments, the method 400 may first extract from the single channel the assignment information and then retrieve the service channel based on the assignment information. At block 430, the method 400 may process the data received over the service channel.

Figure 5:
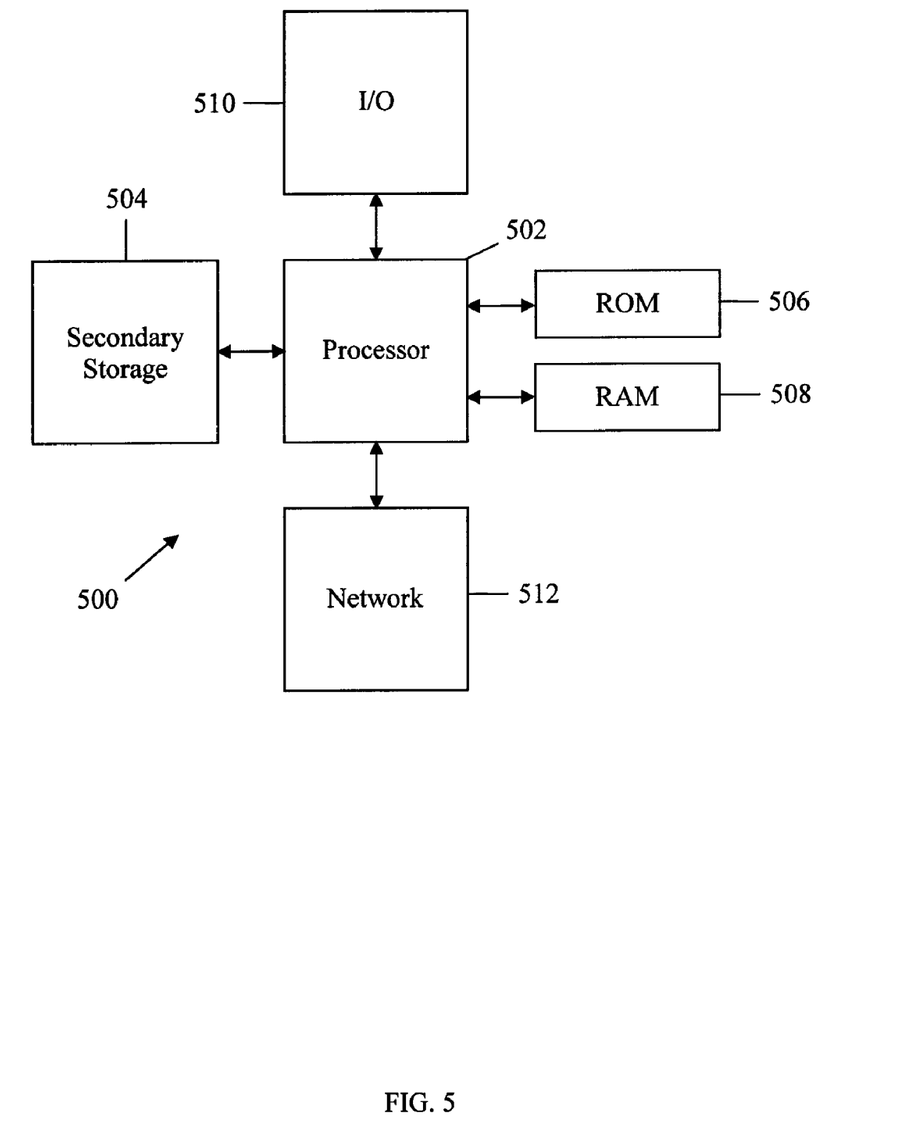
FIG. 5 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 5 illustrates a typical, general-purpose network component suitable for implementing one or more embodiments of a node disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a plurality of data framers;
   a time division multiplexer coupled to the data framers;
   an optical transmitter coupled to the time division multiplexer, wherein the time division multiplexer is positioned between the data framers and the optical transmitter;
   a wavelength division multiplexer (WDM) coupled to the optical transmitter; and
   a plurality of optical receivers coupled to at least some of the data framers and the WDM.

2. The apparatus of claim 1, wherein the framers frame at about 2.5 Gigabits per second (Gbps), the optical transmitter transmits at about 10 Gbps, and the optical receivers receive at about 1.25 Gbps.

3. The apparatus of claim 1, wherein the apparatus is part of an optical line terminal in a passive optical network.

4. An apparatus comprising:
   an optical receiver configured to receive data at a first data rate;
   a time division demultiplexer coupled to the optical receiver;
   a data framer coupled to the time division demultiplexer, wherein the data framer is configured to deframe data at a second data rate that is not the same as the first data rate; and
   a control logic coupled to the time division demultiplexer and the data framer,
   wherein the time division demultiplexer is positioned between the optical receiver and the control logic and between the optical receiver and the data framer.

5. The apparatus of claim 4, further comprising:
an optical transmitter coupled to the data framer;
a wavelength division multiplexer coupled to the optical transmitter and the optical receiver, wherein the optical transmitter is positioned between the data framer and the wavelength division multiplexer, and wherein the optical receiver is positioned between the wavelength division demultiplexer and the time division demultiplexer; and
an optical fiber coupled to the wavelength division multiplexer, wherein the wavelength division multiplexer is positioned between the optical fiber and the optical transmitter and between the optical fiber and the optical receiver.

6. The apparatus of claim 5, wherein the optical fiber is configured to couple to a passive optical network (PON) optical distribution network (ODN) such that the optical fiber is the only connection between the apparatus and the PON ODN, wherein the optical transmitter is configured to transmit an upstream optical signal over the PON ODN via the optical cable, wherein the optical receiver is configured to receive a downstream optical signal from the PON ODN via the optical cable, and wherein the upstream optical signal is transmitted at about 1.25 Gigabits per second (Gbps) and the downstream optical signal is received at about 10 Gbps.

7. The apparatus of claim 4, wherein the time division demultiplexer is configured to reformat a first data stream into a second data stream, wherein the first data stream is received from the optical receiver at the first data rate, and wherein the second data stream is transmitted to the data framer at the second data rate.

8. An apparatus comprising:
at least one component configured to:
combine a first plurality of data frames corresponding to a first plurality of channels into a first plurality of combined data frames using time division multiplexing, wherein at least some of the data frames are received from separate data framers;
transmit the first combined data frames over a single optical channel to a plurality of optical network terminals (ONTs);
assign each of the channels in the first combined data frames to a unique one of the ONTs; and
modify the channel assignment based on the bandwidth required by one or more of the ONTs.

9. The apparatus of claim 8, wherein the component is further configured to:
receive a second plurality of combined data frames from a passive optical network (PON) optical distribution network (ODN); and
separate the second combined data frames into a second plurality of separated data frames, and
wherein the second combined data frames are received at about 1.25 Gbps.

10. The apparatus of claim 8, wherein the component is further configured to:
receive a second plurality of combined data frames from a passive optical network (PON) optical distribution network (ODN); and
separate the second combined data frames into a second plurality of separated data frames, and
wherein the second combined data frames are separated using wavelength division demultiplexing.

11. An apparatus comprising:
at least one component configured to:
combine a first plurality of data frames corresponding to a first plurality of channels into a first plurality of combined data frames using time division multiplexing, wherein at least some of the data frames are received from separate data framers;
transmit the first combined data frames over a single optical channel to a plurality of optical network terminals (ONTs); and
assign each of the channels in the first combined data frames to a unique one of the ONTs,
wherein at least some of the ONTs are configured to ignore channels assigned to other ONTs.

12. The apparatus of claim 11, wherein the component is further configured to:
receive a second plurality of combined data frames from a passive optical network (PON) optical distribution network (ODN); and
separate the second combined data frames into a second plurality of separated data frames, and
wherein the second combined data frames are received at about 1.25 Gbps.

13. The apparatus of claim 11, wherein the component is further configured to:
receive a second plurality of combined data frames from a passive optical network (PON) optical distribution network (ODN); and
separate the second combined data frames into a second plurality of separated data frames, and
wherein the second combined data frames are separated using wavelength division demultiplexing.

14. The apparatus of claim 11, wherein the channels in the first combined data frames are differentiated by an identification mark within each of the first data frames.

15. The apparatus of claim 11, wherein the first combined data frames are transmitted at about 10 Gigabits per second (Gbps) using a single wavelength or within a single wavelength band.

16. The apparatus of claim 11, wherein the optical channel is the only optical channel transmitted by the apparatus to the ONTs.

17. The apparatus of claim 11, wherein the channels in the first combined data frames are differentiated by an identification mark within each of the first data frames.

18. The apparatus of claim 11, wherein the first combined data frames are transmitted at about 10 Gigabits per second (Gbps) using a single wavelength or within a single wavelength band.

19. An apparatus comprising:
an optical receiver configured to receive data at a first data rate;
a time division demultiplexer coupled to the optical receiver:
a data framer coupled to the time division demultiplexer, wherein the data framer is configured to deframe data at a second data rate that is not the same as the first data rate,
wherein the time division demultiplexer is configured to:
receive a first data stream comprising a plurality of data frames at least some of which are associated with the apparatus, wherein the first data stream is received from the optical receiver at the first data rate of about 10 Gigabits per second (Gbps);
separate the data frames associated with the apparatus from the data frames not associated with the apparatus based on the relative position of the data frames within the first data stream, wherein any data frames not associated with the apparatus are disregarded;
reformat the separated data frames into a second data stream; and transmit the second data stream to the data framer at the second data rate of about 2.5 Gbps.

20. The apparatus of claim 19,
wherein the data framer is configured to:
receive the second data stream comprising the separated data frames;
deframe the separated data frames at about 2.5 Gbps;
extract channel assignment information from at least some of the separated data frames; and
send the extracted channel assignment information to the control logic, and wherein the control logic is configured to:
receive the extracted channel assignment information;
process the extracted channel assignment information to determine a channel assignment; and
convey the channel assignment to the time division demultiplexer, wherein the channel assignment indicates the position of data frames assigned to the apparatus in a succeeding data stream.

* * * * *

UNITED STATES PATENT AND TRADEMARK OFFICE
CERTIFICATE OF CORRECTION

| | | |
|---|---|---|
| PATENT NO. | : 8,059,962 B2 | Page 1 of 1 |
| APPLICATION NO. | : 12/051592 | |
| DATED | : November 15, 2011 | |
| INVENTOR(S) | : Frank J. Effenberger | |

It is certified that error appears in the above-identified patent and that said Letters Patent is hereby corrected as shown below:

The title on the front page of the patent should be changed to "Architecture for Passive Optical Network Components".

In column 10, line 50 the ":" after "receiver" should be replaced by a ";".

Signed and Sealed this
Seventeenth Day of January, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,059,962 B2 | Page 1 of 1 |
| APPLICATION NO. | : 12/051592 | |
| DATED | : November 15, 2011 | |
| INVENTOR(S) | : Frank J. Effenberger | |

It is certified that error appears in the above-identified patent and that said Letters Patent is hereby corrected as shown below:

Title Page, Item (54) and at Column 1, line 1, the title of the patent should be changed to "Architecture for Passive Optical Network Components".

In column 10, line 50, the ":" after "receiver" should be replaced by a ";".

This certificate supersedes the Certificate of Correction issued January 17, 2012.

Signed and Sealed this
Fourteenth Day of February, 2012

David J. Kappos
*Director of the United States Patent and Trademark Office*